(12) United States Patent
Chang et al.

(10) Patent No.: US 7,830,374 B2
(45) Date of Patent: Nov. 9, 2010

(54) SYSTEM AND METHOD FOR INTEGRATING DISPERSED POINT-CLOUDS OF MULTIPLE SCANS OF AN OBJECT

(75) Inventors: Chih-Kuang Chang, Taipei Hsien (TW); Xin-Yuan Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 750 days.

(21) Appl. No.: 11/769,728

(22) Filed: Jun. 28, 2007

(65) Prior Publication Data
US 2008/0030498 A1   Feb. 7, 2008

(30) Foreign Application Priority Data
Aug. 4, 2006   (CN) ..................... 2006 1 0061981

(51) Int. Cl.
*G06T 15/00* (2006.01)
(52) U.S. Cl. .................. 345/419; 700/192; 702/32; 702/81; 702/153; 702/167; 715/234
(58) Field of Classification Search ............... 345/419; 700/192; 702/32, 81, 153, 167; 715/234
See application file for complete search history.

(56) References Cited

U.S. PATENT DOCUMENTS

| 6,738,727 | B2 |   | 5/2004  | Chang |
|---|---|---|---|---|
| 6,822,748 | B2 | * | 11/2004 | Johnston et al. ............. 356/608 |
| 6,996,505 | B1 | * | 2/2006  | Edelsbrunner et al. ......... 703/2 |
| 7,065,461 | B2 | * | 6/2006  | Chang et al. .................. 702/81 |
| 7,107,157 | B2 | * | 9/2006  | Chang et al. .................. 702/32 |
| 7,117,116 | B2 | * | 10/2006 | Chang et al. ................ 702/153 |
| 7,225,396 | B2 | * | 5/2007  | Chen et al. .................. 715/234 |
| 7,254,462 | B2 | * | 8/2007  | Chang et al. ................ 700/192 |
| 7,257,249 | B2 | * | 8/2007  | Farsaie ....................... 382/154 |
| 7,406,395 | B2 | * | 7/2008  | Wu et al. .................... 702/167 |

* cited by examiner

*Primary Examiner*—Phu Nguyen
(74) *Attorney, Agent, or Firm*—Frank R. Niranjan (57) ABSTRACT

A system for integrating dispersed point-clouds of an object is provided. The system includes a fixture for fixing an object, a measurement machine to scan all surfaces of the object and a computer. The fixture, which has three reference balls, is 360-degree rotatable. The computer includes a point-cloud reading module, a sphere fitting module, a computing module, a matching module and an aligning module. The system utilizes three reference objects to integrate dispersed point-clouds of multiple scans of the object, restore original space location relations of the point-clouds, so as to obtain a complete space point-cloud of the object with simple operation and higher precision. A related method is also provided.

11 Claims, 6 Drawing Sheets

SYSTEM AND METHOD FOR INTEGRATING DISPERSED POINT-CLOUDS OF MULTIPLE SCANS OF AN OBJECT

FIELD OF THE INVENTION

The present invention generally relates to measuring systems and methods, and more particularly, to a system and method for integrating dispersed point-clouds of an object.

DESCRIPTION OF RELATED ART

A point-cloud, often created by probing a surface of an object utilizing a three-dimensional (3-D) measurement machine, is a set of 3D points describing the outlines and/or surface features of the object. Generally, multiple scans, or even hundreds of scans, are required in order to obtain information of all surfaces of the object (multiple-angles data acquisition). In order to obtain a complete 3-D model/space point-cloud, multiple point-clouds from the multiple scans are aligned with each other and merged into an integrated point-cloud of the object.

At present, methods for aligning the multiple point-clouds requires delicate and complicated equipments, or accurate data acquisition procedures, such as presetting some reference points on the object before scanning, identifying common reference points in 3D point-clouds at different angles, ascertaining locations of the common reference points, computing coordinate transformation relations of the 3D point-clouds based on the locations of the common reference points, and aligning the 3D point-clouds according to the coordinate transformation. A predetermined condition of the method is that the reference points are represented by characteristics of the object, so it's inevitable that the method would have errors.

What is needed, therefore, is a system and method for aligning multiple dispersed point-clouds of an object with simpler operations and higher precision, so as to restore original space location relations of the multiple dispersed point-clouds, and obtain an integrated point-cloud of the object.

SUMMARY OF THE INVENTION

A system for integrating dispersed point-clouds of multiple scans of an object in accordance with a preferred embodiment includes a computer, a measurement machine connected to the computer, and a fixture for locating an object to be scanned. The fixture includes three reference balls. The computer includes: a point-cloud reading module for reading a point-cloud of the object and references point-clouds of the three reference balls corresponding to each of the scans; a sphere fitting module for fitting a group of three spheres which forms a scalene triangle, according to the reference point-clouds of each of the scans; a computing module for computing a location of each sphere and a distance between two adjacent spheres in each scalene triangle; a matching module for selecting one scan of the object as a base scan and selecting the scalene triangle corresponding to the base scan as a base triangle, mapping each sphere of other scalene triangles corresponding to other scans with a corresponding base sphere in the base triangle, based on the distance between two adjacent spheres in each scalene triangle; and an aligning module for aligning each sphere in each of other scalene triangles to the corresponding base sphere based on a location of the sphere and a mapping relation with the base sphere, obtaining transformation matrixes of the alignment, and for aligning the point-clouds of the object corresponding to other scans to the point-cloud of the object corresponding to the base scan according to the transformation matrixes, to obtain an integrated point-cloud of the object.

Another preferred embodiment provides a method for integrating dispersed point-clouds of multiple of an object by utilizing the above system. The method includes the steps of: (a) fixing the object on a rotatable fixture holding three reference balls; (b) rotating the fixture to scan all surfaces of the object, and scanning the three reference balls once when scanning each surface of the object; (c) reading a point-cloud of the object and reference point-clouds of the three reference balls corresponding to each scan towards the object; (d) fitting a group of three spheres which forms a scalene triangle, according to the reference point-clouds of the three reference balls corresponding to each scan towards the object; (e) computing a location of each sphere and a distance between two adjacent spheres in each scalene triangle; (f) selecting one scan of the object as a base scan and the scalene triangle corresponding to the base scan as a base triangle, mapping each sphere in other scalene triangles with a corresponding base sphere in the base triangle, based on a distance between two adjacent spheres in each scalene triangle; (g) aligning each sphere in each of other scalene triangles to the corresponding base sphere based on a location of the sphere and a mapping relation with the base sphere; (h) obtaining transformation matrixes of the alignment; and (i) aligning the point-clouds of the object corresponding to other scans to the point-cloud of the object corresponding to the base scan according to the transformation matrixes, to obtain an integrated point-cloud of the object.

The invention computes a complete space point-cloud of an object by integrating space point captures of the object. The space point captures of the object are integrated by aligning triangles formed by reference point-clouds of three reference balls in each of the captures.

Other objects, advantages and novel features of the present invention will be drawn from the following detailed description of the preferred embodiment and preferred method of the present invention with the attached drawings.

DETAILED DESCRIPTION OF THE PREFERRED EMBODIMENT

Figure 1:
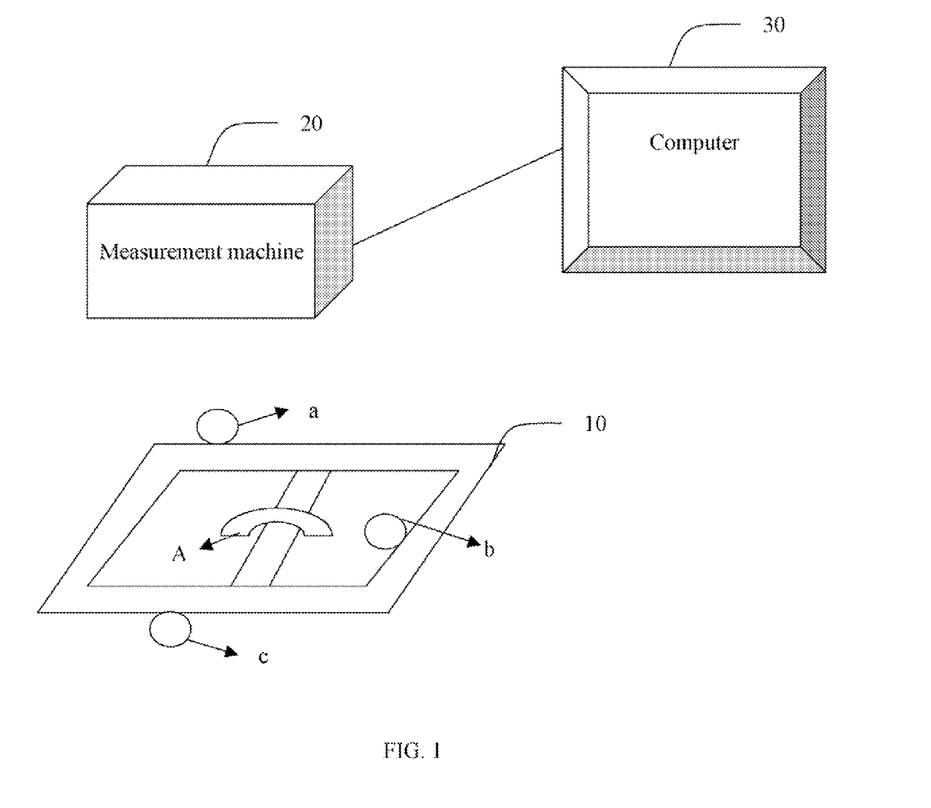
FIG. 1 is a schematic diagram illustrating a system for integrating dispersed point-clouds of multiple scans of an object according to a preferred embodiment.

FIG. 1 is a schematic diagram illustrating a system for integrating dispersed point-clouds of multiple scans of an object according to a preferred embodiment. The system typically includes a fixture 10, a measurement machine 20, and a computer 30.

The fixture 10 can be rotated 360 degrees, and is configured for receiving an object A to be scanned and exposing all surfaces of the object A to be scanned by the measurement machine 20. There are three reference balls a, b, and c on the fixture 10. In this embodiment, the three reference balls, which are of the same size and made of china, form three corners of a scalene triangle. In other embodiments, the three reference balls may be of different sizes and made of other materials that provide smooth and bright surfaces.

The measurement machine 20 is used for scanning the surfaces of the object A to obtain space point captures. Each space point capture includes a point cloud of the object A and a reference point-cloud of each of the three reference balls corresponding to one scanned surface of the object A.

Figure 2:
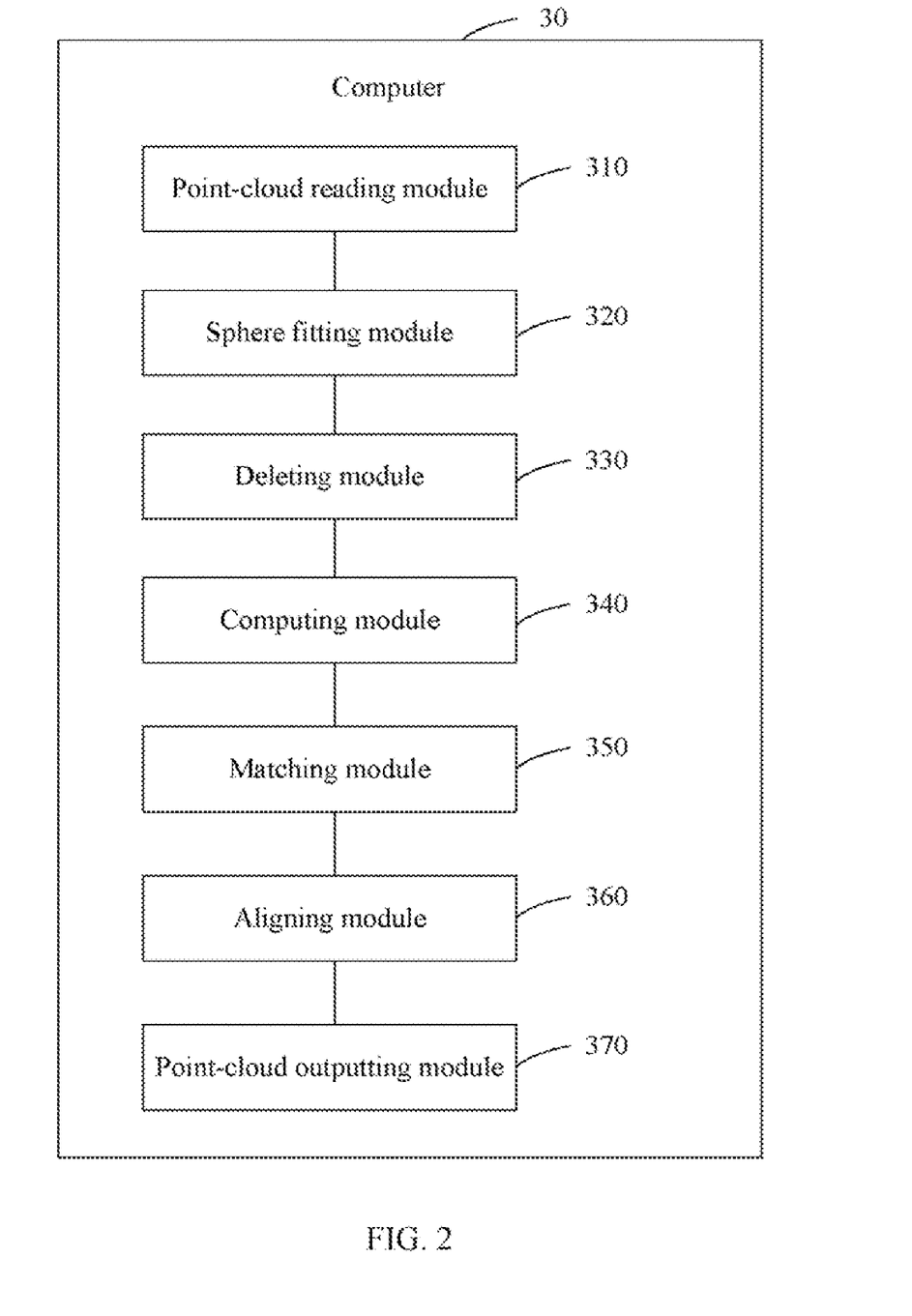
FIG. 2 is a block diagram illustrating main function modules of a computer in FIG. 1.

The computer 30 is used for reading the point-cloud of the object A and reference point-clouds of the three reference balls corresponding to the scanned surface of the object A, fitting a group of three spheres of the three reference balls a, b and c according to the reference point-clouds of the three reference balls, and aligning the point-clouds of the object A to obtain an integrated point-cloud of the object A by utilizing the group of spheres (detailed description is given in FIG. 2).

FIG. 2 is a block diagram illustrating main function modules of the computer 30. The computer 30 includes a point-cloud reading module 310, a sphere fitting module 320, a deleting module 330, a computing module 340, a matching module 350, an aligning module 360, and a point-cloud outputting module 370.

The point-cloud reading module 310 is programmed for reading the point-clouds of the object A and the reference point-clouds of the three reference balls corresponding to each scanned surface of the object obtained by the measurement machine 20. For example, the point-cloud reading module 310 reads three reference point-clouds "scan0", "scan1", "scan2" of the three reference balls a, b, and c corresponding to a top surface of the object A, and reads three reference point-clouds "scan3", "scan4", "scan5" of the three reference balls a, b, and c corresponding to a back side of the object A.

The sphere fitting module 320 is programmed for fitting a group of three spheres according to the reference point-clouds of the three reference balls corresponding to each scanned surface of the object A. For example, the sphere fitting module 320 fits a first group of three spheres Q1, Q2, and Q3 according to the three reference point-clouds "scan0", "scan1", "scan2", and fits a second group of three spheres M1, M2, and M3 according to the three reference point-clouds "scan3", "scan4", "scan5", by applying the least square method.

The deleting module 330 is programmed for deleting messy points surround each fitted sphere. Furthermore, the deleting module 330 is programmed for deleting all the spheres and all the reference point-clouds of the three reference balls a, b and c, after obtaining the integrated point-cloud of the object A.

The computing module 340 is programmed for computing a location of each of the spheres in the space point captures, and computing a distance between adjacent spheres of the group of spheres, such as

|Q1Q2|, |Q2Q3|, |Q1Q3|, and |M1M2|, |M2M3|, |M1M3|.

The matching module 350 is programmed for selecting one of the space point captures of the object A as a base space point capture and selecting the group of three spheres corresponding to the base space point capture as base spheres, mapping each sphere in other groups corresponding to other space point captures to a corresponding base sphere according to the distance between adjacent spheres in each group. Suppose that, taking the first group of spheres Q1, Q2, and Q3 as base spheres, because the three reference balls a, b, c on the fixture 10 form a scalene triangle, that is to say,

|ab|≠|bc|≠|ac|, the spheres in each group also form a scalene triangle, namely,

|Q1Q2|≠|Q2Q3|≠|Q1Q3|, and |M1M2|≠|M2M3|≠|M1M3|.

If |Q1Q2|=|M1M2|, |Q2Q3|=|M2M3|, and |Q1Q3|=|M1M3|, the sphere M1 maps the sphere Q1, the sphere M2 maps the sphere Q2, and the sphere M3 maps the sphere Q3.

The aligning module 360 is programmed for aligning each sphere in the other groups of three spheres to each corresponding base sphere based on a location of the sphere and a matching relation with the corresponding base sphere, and reading transformation matrixes of the alignment. For example, the aligning module 360 aligns the scalene triangle M1, M2, M3 to the scalene triangle Q1, Q2, Q3 by translating and rotating the scalene triangle M1, M2, M3 until the spheres M1, M2, M3 superposes the spheres Q1, Q2, Q3 respectively, and reads a translating matrix and a rotating matrix. Furthermore, the aligning module 360 is programmed for aligning the point-clouds of the object A of other space point captures to the base point-clouds of the object A of the base space point capture according to the transformation matrixes, such as the translating matrix and the rotating matrix, to obtain the integrated point-cloud of the object A.

The point-cloud outputting module 370 is programmed for outputting the integrated point-cloud of the object A into a CAD system.

Figure 3:
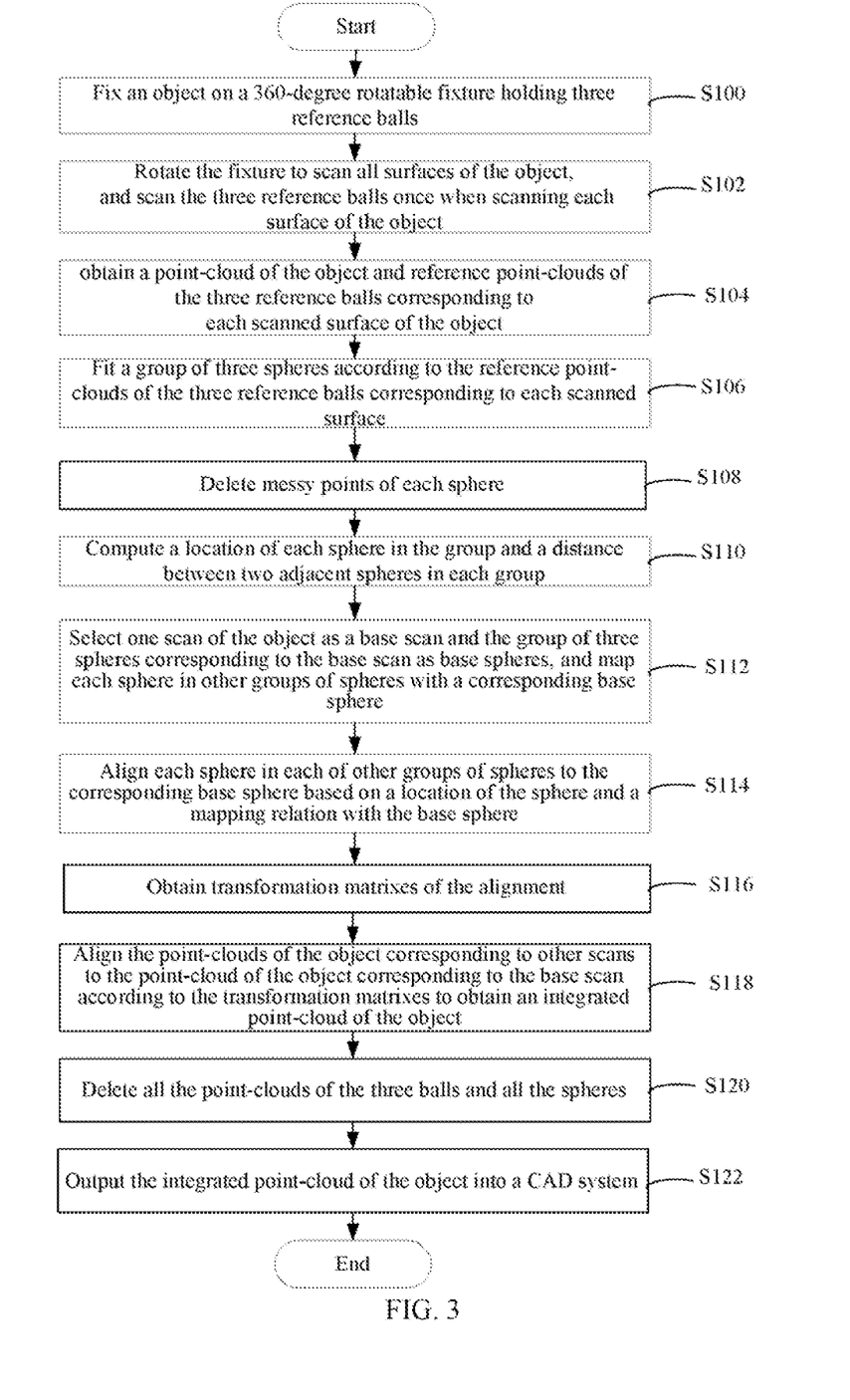
FIG. 3 is a flowchart of a preferred method for integrating dispersed point-clouds of multiple scans of an object.
Figure 4:
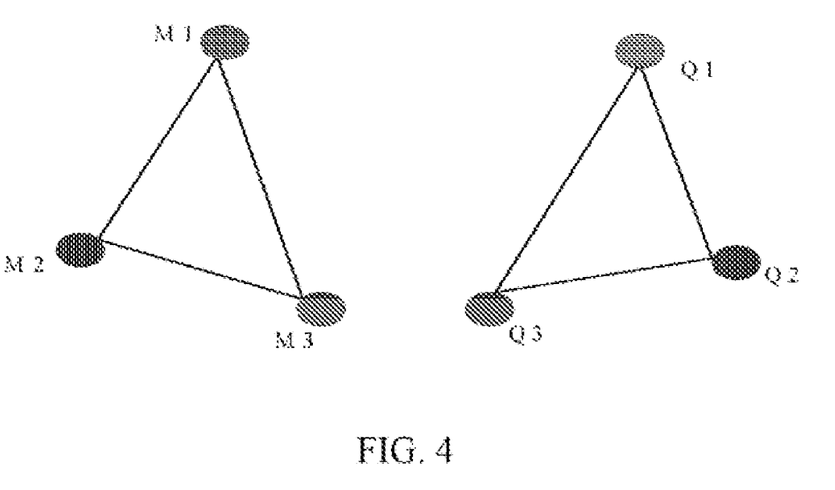
FIG. 4 to FIG. 6 show an aligning process of two groups of fitted spheres.

FIG. 3 is a flowchart of a preferred method for integrating dispersed point-clouds of multiple scans of an object. In step S100, an object A is fixed on a fixture 10. The fixture 10 can be rotated 360 degrees to expose all surfaces of the object A to be scanned by the measurement machine 20. There are three reference balls a, b and c on the fixture 10. In this embodiment, the three reference balls, which are of the same size and made of china, form three corners of a scalene triangle. In other embodiments, the three reference balls may be of different sizes and made of other materials that provide smooth and bright surfaces.

In step S102, the fixture 10 is rotated to expose all surfaces of the object A to be scanned by the measurement machine 20. The measurement machine 20 obtains space point captures of the object A and the three reference balls a, b, and c. Each space point capture includes a point cloud of the object A and a reference point-cloud of each of the three reference balls corresponding to one scanned surface of the object A.

In step S104, the point-cloud reading module 310 reads point-clouds of the object A and reference point-clouds of the three reference balls corresponding to each scanned surface of the object obtained by the measurement machine 20. For example, the point-cloud reading module 310 reads three reference point-clouds "scan0", "scan1", "scan2" of the three reference balls a, b, and c corresponding to a top surface of the object A, and reads three reference point-clouds "scan3", "scan4", "scan5" of the three reference balls a, b, and c corresponding to a back side of the object A.

In step S106, the sphere fitting module 320 fits a group of three spheres according to the reference point-clouds of the three reference balls corresponding to each scanned surface of the object A. For example, the sphere fitting module 320 fits a first group of three spheres Q1, Q2, and Q3 according to the three reference point-clouds "scan0", "scan1", "scan2", and fits a second group of three spheres M1, M2, and M3 according to the three reference point-clouds "scan3", "scan4", "scan5", by applying the least square method.

In step S108, the deleting module 330 deletes messy points surround each of the fitted spheres.

In step S110, the computing module 340 computes a location of each sphere, and computes a distance between each adjacent spheres in the each group such as

|Q1Q2|,|Q2Q3|,|Q1Q3|, and |M1M2|,|M2M3|,|M1M3|.

In step S112, the matching module 350 selects one of the space point captures of the object A as a base space point capture and selects the group of three spheres corresponding to the base space point capture as base spheres, maps each sphere in other groups corresponding to other space point captures to a corresponding base sphere according to the distance between adjacent spheres in each group. Suppose that, taking the first group of spheres Q1, Q2, and Q3 as base spheres, because the three reference balls a, b, c on the fixture 10 form a scalene triangle, that is to say,

|ab|≠|bc|≠|ac|, the spheres in each group also form a scalene triangle, namely,

|Q1Q2|≠|Q2Q3|≠|Q1Q3|, and |M1M2|≠|M2M3|≠|M1M3|.

If |Q1Q2|=|M1M2|, |Q2Q3|=|M2M3|, and |Q1Q3|=|M1M3|, the sphere M1 maps the sphere Q1, the sphere M2 maps the sphere Q2, and the sphere M3 maps the sphere Q3.

Figure 5:
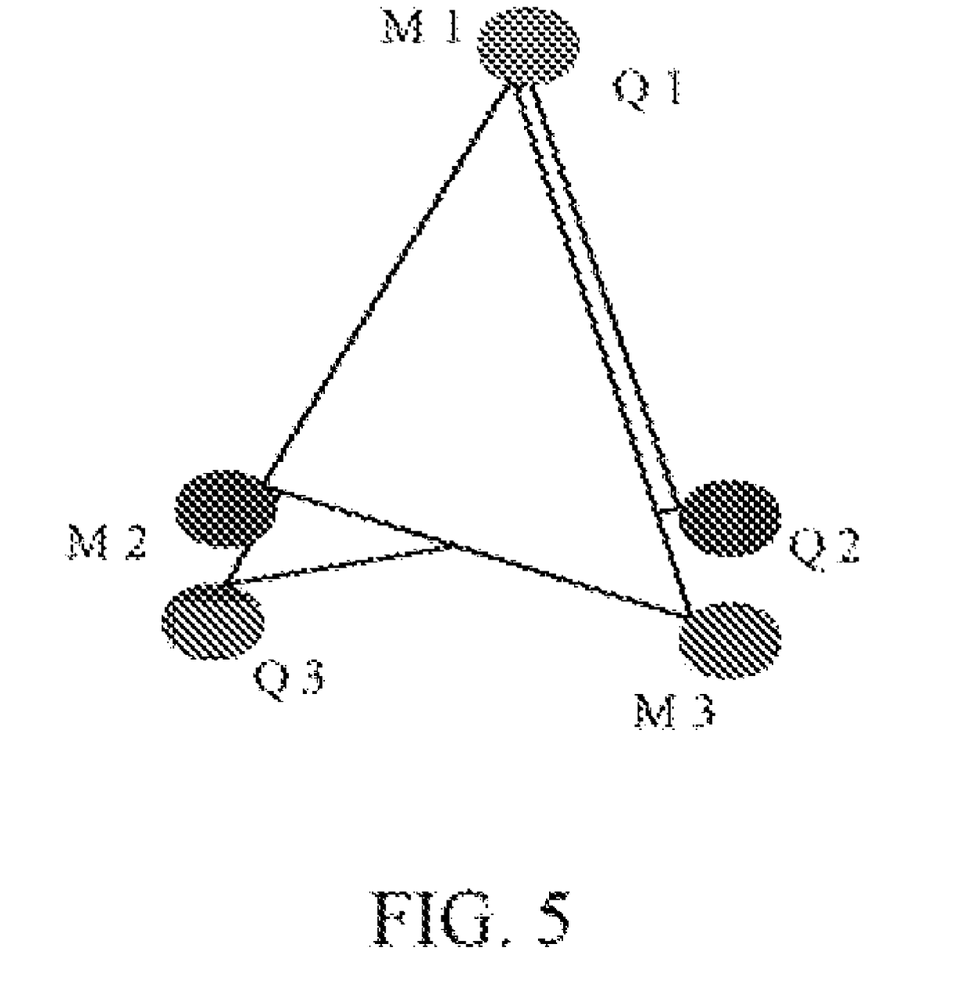
Figure 6:
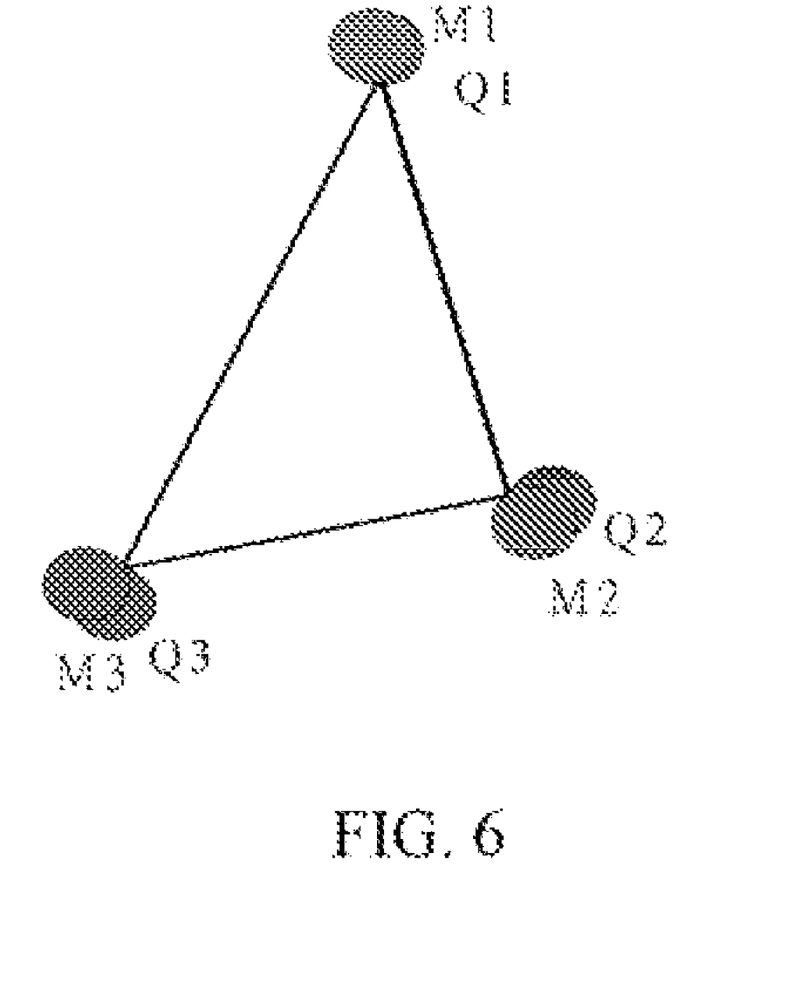

In step S114, the aligning module 360 aligns each sphere in the other groups of three spheres to each corresponding base sphere based on a location of the sphere and a matching relation with the corresponding base sphere, and reading transformation matrixes of the alignment. For example, the aligning module 360 aligns the scalene triangle M1, M2, M3 to the scalene triangle Q1, Q2, Q3 by translating and rotating the scalene triangle M1, M2, M3 until the spheres M1, M2, M3 superposes the spheres Q1, Q2, Q3 respectively, detailed description is as that: (a) translating the first triangle M1 M2M3 until the sphere (or vertex) M1 superposes the sphere (or vertex) Q1 of the second triangle Q1Q2Q3 (shown in FIG. 5), to obtain a first transformation matrix D1; (b) taking the vertex Q1 as a rotating origin, a normal vector of the plane Q1Q2M2 as a first rotating axis, and a first inner angle between a first side Q1 Q2 and a second side Q1 M2 as a first rotating angle, to rotate the third side M1 M2 until the third side M1 M2 superposes the first side Q1Q2, to obtain a second transformation matrix D2; (c) taking the vertex Q1 as the rotating origin, the first side Q1Q2 as the second rotating axis, and a second inner angle between the second side Q1 M2 and a fourth side Q1 Q3 as a second rotating angle, to rotate a fifth side M1M3 until the fifth side M1M3 superposes the fourth side Q1Q3 (shown in FIG. 6), to obtain a third transformation matrix D3.

In step S116, the aligning module 360 reads transformation matrixes of the alignment, such as the first translating matrix D1, the second transformation matrix D2 and the third transformation matrix D3.

In step S118, the aligning module 360 aligns the point-clouds of the object A of other space point captures to the base point-clouds of the object A of the base space point capture according to the transformation matrixes, such as the transformation matrixes D1, D2, and D3, to obtain an integrated point-cloud of the object A.

In step S120, the deleting module 330 deletes all the point-clouds of the three reference balls a, b and c, and all the spheres.

In step S122, the point-cloud outputting module 370 outputs the integrated point-cloud of the object A to a CAD system.

Although the present invention has been specifically described on the basis of a preferred embodiment and preferred method, the invention is not to be construed as being limited thereto. Various changes or modifications may be made to the embodiment and method without departing from the scope and spirit of the invention.

What is claimed is:

1. A system for integrating dispersed point-clouds of multiple scans of an object comprising a computer, a measurement machine connected to the computer, and a rotatable fixture that fixes the object and three reference balls, wherein the three reference balls form a scalene triangle, the measurement machine performing scans on all surfaces of the object for obtaining a point-cloud of one surface of the object and a reference point-cloud of each reference ball after each of the scans, the computer comprising:

a point-cloud reading module for reading a point-cloud of the object and the reference point-clouds of the three reference balls corresponding to each of the scans;

a sphere fitting module for fitting a group of three spheres which forms a scalene triangle, according to the reference point-clouds of each of the scans;

a computing module for computing a location of each sphere and a distance between two adjacent spheres in each scalene triangle;

a matching module for selecting one scan of the object as a base scan and selecting the scalene triangle corresponding to the base scan as a base triangle, mapping each sphere of other scalene triangles corresponding to other scans with a corresponding base sphere in the base triangle, based on the distance between two adjacent spheres in each scalene triangle;

an aligning module for aligning each sphere in each of other scalene triangles to the corresponding base sphere based on a location of the sphere and a mapping relation with the base sphere, obtaining transformation matrixes of the alignment, and for aligning the point-clouds of the object corresponding to other scans to the point-cloud of the object corresponding to the base scan according to the transformation matrixes, to obtain an integrated point-cloud of the object; and at least one processor that executes the point-cloud reading module, the sphere fitting module, the computing module, the matching module, and the aligning module.

2. The system as claimed in claim 1, wherein the computer further comprises a deleting module, for deleting messy points surrounding each sphere, and for deleting reference point-clouds of the three reference balls and all the spheres after obtaining the integrated point-cloud of the object.

3. The system as claimed in claim 1, wherein the computer further comprises a point-cloud outputting module, for outputting the integrated point-cloud of the object to a computer aided system.

4. The system as claimed in claim 1, wherein the three reference balls are of the same size.

5. The system as claimed in claim 1, wherein the three reference balls are of different size.

6. A computer-based method for integrating dispersed point-clouds of multiple scans of an object, the method being performed by execution of a computer-readable program code by at least one processor of a computer, and comprising:

fixing the object on a rotatable fixture holding three reference balls that form a scalene triangle;

rotating the fixture to scan all surfaces of the object, and scanning the three reference balls once when scanning each surface of the object;

reading a point-cloud of the object and reference point-clouds of the three reference balls corresponding to each scan towards the object;

fitting a group of three spheres which forms a scalene triangle, according to the reference point-clouds of the three reference balls corresponding to each scan towards the object;

computing a location of each sphere and a distance between two adjacent spheres in each scalene triangle;

selecting one scan of the object as a base scan and the scalene triangle corresponding to the base scan as a base triangle, mapping each sphere in other scalene triangles with a corresponding base sphere in the base triangle, based on a distance between two adjacent spheres in each scalene triangle;

aligning each sphere in each of other scalene triangles to the corresponding base sphere based on a location of the sphere and a mapping relation with the base sphere;

obtaining transformation matrixes of the alignment; and aligning the point-clouds of the object corresponding to other scans to the point-cloud of the object corresponding to the base scan according to the transformation matrixes, to obtain an integrated point-cloud of the object.

7. The method as claimed in claim 6, further comprising:
deleting messy points surrounding each sphere before the computing step.

8. The method as claimed in claim 6, further comprising:
deleting reference point-clouds of the threes reference balls and all the spheres after obtaining the integrated point-cloud of the object.

9. The method as claimed in claim 6, further comprising:
outputting the integrated point-cloud of the object to a computer aided system.

10. The method as claimed in claim 6, wherein the three reference balls are of the same size.

11. The method as claimed in claim 6, wherein the three reference balls are of different size.

* * * * *